United States Patent [19]

Imai et al.

[11] Patent Number: 4,876,666
[45] Date of Patent: Oct. 24, 1989

[54] WAVELENGTH SELECTIVE OPTICAL DATA STORAGE SYSTEM

[75] Inventors: Hitoshi Imai; Kazuo Okada; Michihiro Tadokoro, all of Amagasaki, Japan

[73] Assignee: Mitsubishi Denki Kabushiki Kaisha, Tokyo, Japan

[21] Appl. No.: 140,210

[22] Filed: Dec. 31, 1987

[30] Foreign Application Priority Data

Apr. 23, 1987 [JP] Japan .................................. 62-102712

[51] Int. Cl.$^4$ ............................................. G11C 13/04
[52] U.S. Cl. .................................. 365/106; 346/76 L; 369/109; 369/100; 369/102
[58] Field of Search ............... 365/106, 119, 120, 123; 369/100, 102, 109, 121, 112; 346/76 L, 135.1

[56] References Cited

U.S. PATENT DOCUMENTS 4,101,976 7/1978 Castro et al. ....................... 365/119
4,689,781 8/1987 Ando ................................... 369/122

FOREIGN PATENT DOCUMENTS 58-51355 11/1983 Japan .

Primary Examiner—Robert L. Richardson
Attorney, Agent, or Firm—Fleit, Jacobson, Cohn, Price, Holman & Stern

[57] ABSTRACT

Information is recorded by creating recording hole at a predetermined wavelength position on a memory element with a characteristic of wavelength selective optical data storage. Because the memory element is pit-like, it causes diffraction of a light beam transmitted through or reflected by it. The diffracted beams are detected for positioning a beam spot right on the selected memory element.

7 Claims, 3 Drawing Sheets

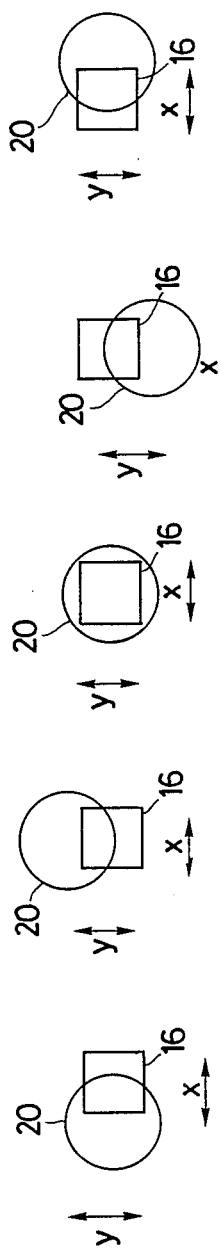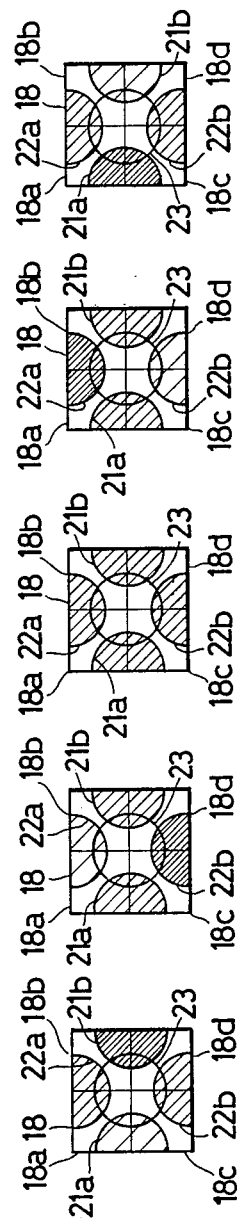

WAVELENGTH SELECTIVE OPTICAL DATA STORAGE SYSTEM

BACKGROUND OF THE INVENTION

This invention relates to a wavelength selective optical data storage system.

FIG. 1 shows an optical wavelength division multiplex recording and reproducing apparatus and FIGS. 2A, 2B and 2C show the wavelength spectrum fo the recording medium, which were proposed previously in the Japanese Patent Publication No. 51355/1983. A diverging beam emitted from light source 10 is collimated by collimator lens 12. The parallel beam from lens 12 passes through optical deflector 13 and is focused by objective lens 14 on memory element 16 of recording medium 15 which has a function of wavelength (frequency) selective optical data storage, namely, which exhibits inhomogeneous absorption line broadening and undergoes a photo induced reaction upon exposure to light. One of elements 16 is selected by deflecting the beam through deflector 13. The beam transmitted through element 16 is detected by photodetector 17.

The principle of wavelength selective optical data storage is described below with reference to FIGS. 2A. 2B and 2C. FIG. 2A shows absorption spectrum (inhomogeneous absorption line broadening) of element 16 on which no recording is made. It is understood from FIG. 2A that the light beam, such as a laser, with broad range of wavelength is absorbed by element 16. When the beam of specific wavelength with intensity spectrum as shown by the dotted line in FIG. 2A is incident on element 16, a hole is created or burned at the corresponding wavelength position on absorption spectrum as shown in FIG. 2B. The hole means that a data bit "1" is recorded in the wavelength and therefore a data bit "0" is expressed with the non-hole portion.

Namely, data bits are stored by selective photo induced reactions induced by a narrow band light beam at specific wavelength positions within the broad inhomogeneous line.

Any hole can be created, in other words a data bit "1" can be recorded, by adjusting the wavelength of light source 10 to that of the recording hole and making the light intensity high at the level necessary for recording.

The beam emitted from source 10 is scanned or tuned with respect to wavelength by wavelength controller 11 in a recording wavelength band of an upper limit A to a lower limit B with a constant intensity to reproduce the recorded data. Since the absorptive power of the element is lowered at the wavelength of the recorded hole as shown in FIG. 2B, the output of photodetector 17 has the spectrum as shown in FIG. 2C. Although FIG. 2C shows a wavelength spectrum, photodetector 17 outputs a time series signal corresponding to the spectrum when the wavelength is scanned at a constant rate.

Since known optical wavelength selective optical data storage system is comprised as mentioned above, there is provided no detecting means detecting the relative position between memory element 16 and a beam spot focused thereon. Accordingly it was difficult to position the beam spot precisely on the selected memory element and to perform high density recording.

SUMMARY OF THE INVENTION

An object of the invention is to solve the problems stated above.

Another object of the invention is to provide a wavelength selective optical data storage system wherein the beam spot can be positioned precisely on the selected memory element on the recording medium.

According to the invention, there is provided a wavelength selective optical data storage system comprising a light source emitting a light beam with a variable wavelength, a recording medium having at least one pit-like memory element with a characteristic of wavelength selective optical data storage, the pit-like memory element causing diffraction of the light beam transmitted through or reflected by it, an optical means guiding the beam emitted from the source into the medium, a position controlling means controlling a position of a beam spot on the medium so that it is positioned right on the selected memory element, and a photodetector detecting the beam transmitted through or reflected by the pit-like memory element, wherein the photodetector is divided by at least one dividing line into two portions so that each portion detects at least part of two diffracted beams which are generated by the diffraction through the pit-like memory element, and the position controlling means controls the position of the beam spot in accordance with error signal produced from the difference between outputs of the two portions.

According to the invention, because the controlling means is controlled in accordance with error signal produced from output of the divided photodetector detecting the beam diffracted by the pit-like memory element, the beam spot can be positioned precisely on the selected memory element and therefore memory element can be formed on the recording medium in high density, so that high density information recording can be performed.

BRIEF DESCRIPTION OF THE DRAWINGS

FIGS. 4A, 4B, 4C, 4D and 4E are explanatory diagrams explaining a relation of a relative position between a pit-like memory element and a beam spot and the first order diffracted beam.

DETAILED DESCRIPTION OF THE PREFERRED EMBODIMENTS

Figure 1:
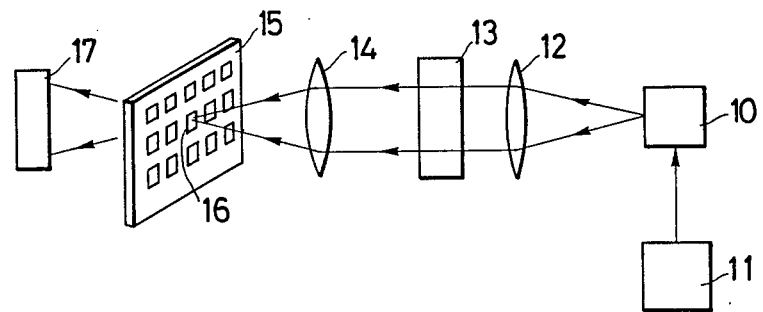
FIG. 1 is a schematic diagram of a wavelength selective optical data storage system of the prior art.
Figure 2A:
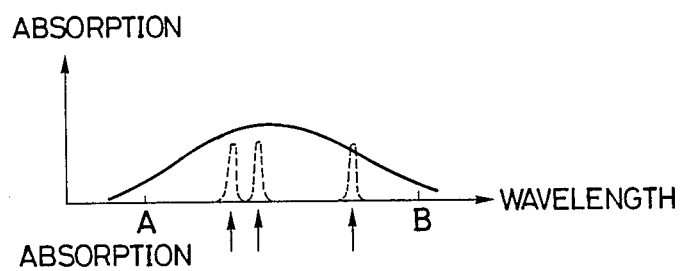
FIGS. 2A, 2B and 2C are explanatory diagrams explaining the principle of the system shown in FIG. 1.
Figure 2B:
Figure 2C:
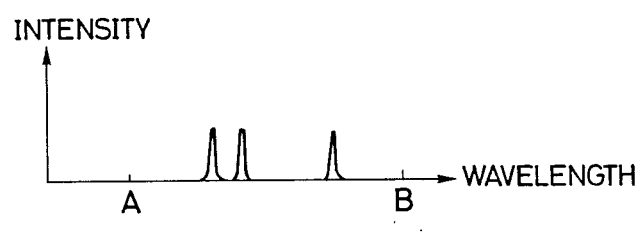
Figure 3:
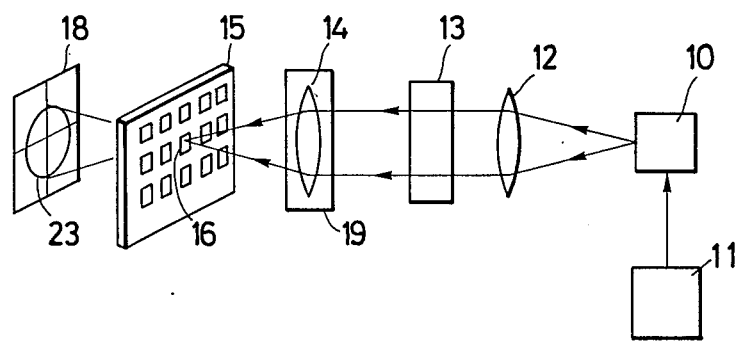
FIG. 3 is a schematic diagram showing a wavelength selective optical data storage system according to the invention.

An embodiment of the invention is described below with reference to the accompanying drawings. In FIG. 3, reference numerals 10 to 16 designate the same elements as shown in FIG. 1. In the invention, however, medium 15 is provided with pit-like memory elements 16. The depth of the pit is about one-eighth of a specific wavelength within the range of wavelength scanning (recording wavelength band), for instance, one-eighth of the specific wavelength at the middle of the scanning range.

Reference numeral 18 is a photodetector divided into 4 portions 18a, 18b, 18c and 18d by two dividing lines orthogonal to each other, which detects the diffracted beams by memory element 16 and outputs reproduced signal of data bits.

Reference numeral 19 is an acutating means actuating objective lens 14, 20 is a beam spot on medium 15, 21a, 21b, 22a and 22b are the first order diffracted beam diffracted by the pit-like memory element 16, and 23 designates a zeroth order diffracted beam on photodetector 18.

The principle of recording and reproducing is the same as in the prior art.

Namely, memory element 16 has a function of wavelength selective data storage and data bits are stored by selective photo induced reactions induced by a narrow band light beam at specific wavelength positions within the broad inhomogeneous line. However photodetector 18 in the invention is divided into 4 portions 18a, 18b, 18c, and 18d, and therefore the reproduced signal is obtained by adding the outputs thereof Sa, Sb, Sc and Sd.

Explained with reference to FIGS. 4A, 4B, 4C, 4D and 4E is the relationship between the relative position of memory element 16 and beam spot 20 and the diffracted beam. The beam transmitted through or reflected by memory element 16 is diffracted by it because it is formed on medium 15 in pit-like configuration. The diffraction is most effective when the depth of the pit is one-eighth of beam wavelength. Photodetector 18 is positioned so that at least part of four beams diffracted by respective four edges of memory element 16 formed in the shape of a rectangle or square pit can be detected at the same time and the dividing lines thereof are parallel to the sides of the rectangle or square pit. In the case shown in FIG. 4C, because beam spot 20 is positioned right on memory element 16, the first order diffracted beams 21a, 21b, 22a and 22b have intensity distributions symmetrical with respect to the two dividing lines. By contrast, as shown in FIGS. 4A, 4B, 4D and 4E, when the position of beam spot 20 relative to memory element 16 shifts, the intensity distribtions on photodetector 18 by diffracted beams 21a, 21b, 22a and 22b are unbalanced according to the shift direction and distance thereof. For instance, as shown in FIG. 4A, when beam spot 20 shifts on element 16 only to the left side on the drawing, the intensity of the first order diffracted beam 21a increases (as shown by sparse (wide pitch) hatching) and that of the first order diffracted beam 21b decreases (as shown by dense (narrow pitch) hatching) on photodetector 18, respectively. At this time intensity distributions by the beams 22a and 22b are not unbalanced because there is no position shift of beam spot 20 in this direction. Accordingly the position of beam spot 20 relative to pit-like memory element 16 is detected from the unbalanced outputs of photodetectors 18a, 18b, 18c and 18d. Namely, error signals in the direction of axis x (abscissa) and axis y (ordinate) are produced from the difference between the sum of Sa and Sc and the sum of Sb and Sd and from the difference between the sum of Sa and Sb and the sum of Sc and Sd, respectively. It is possible to control precisely the position of beam spot 20 relative to pit-like memory element 16 as shown in FIG. 4C by acutating objective lens 14 through acutating means 19 in the direction perpendicular to optic axis in accordance with the feedback error signals.

Although photodetector 18 is divided into 4 portions in the embodiment described above, it can be divided into 2 portions when the position of beam spot 20 is controlled only in the direction of ordinate or abscissa.

Also the beam spot position can be controlled by deflector 13 when it has the function of precise control.

What is claimed is:

1. A wavelength selective optical data storage system comprising:
   a light source emitting a light beam with a variable wavelength,
   a recording medium having at least one pit-like memory element with a characteristic of wavelength selective optical data storage on which information is recorded by creating at least one recording hole by a narrow band light beam at specific wavelength position within a broad inhomogeneous absorption line, the pit-like memory element causing diffraction of the light beam transmitted through or reflected by it,
   an optical means guiding the beam emitting from the source into the medium,
   a position controlling means controlling a position of a beam spot on the medium so that it is positioned on the selected memory element, and
   a photodetector detecting the beam transmitted through or reflected by the pit-like memory element,
   wherein the photodetector is divided by a first dividing line into two portions so that each portion detects at least part of two diffracted beams which are generated by the diffraction through the pit-like memory element, and
   the position controlling means controls the position of the beam spot in accordance with an error signal produced from the difference between outputs of the two portions of the photodetector.

2. A wavelength selective optical data storage system according to claim 1, wherein the pit-like memory element has a depth of the one-eighth of specific wavelength within the recording wavelength band thereof.

3. A wavelength selective optical data storage system according to claim 2, wherein the depth is the one-eighth of a specific wavelength at the middle of the broad inhomogeneous absorption line.

4. A wavelength selective optical data storage system according to claim 1, wherein the pit-like memory element has a shape of a rectangle or a square having four sides so that the four sides thereof cause four diffracted beams.

5. A wavelength selective optical data storage system according to claim 4, wherein the photodetector has a second dividing line orthogonal to the first dividing line so that it is divided into four portions, and
   the position controlling means controls the beam spot in two directions orthogonal to each other.

6. A wavelength selective optical data storage system according to claim 4, wherein the photodetector is divided into four portions and is positioned so that it can detect at least part of the four diffracted beams at the same time.

7. A wavelength selective optical data storage system according to claim 5, wherein two dividing lines are parallel to two pairs of sides of the rectangle or the square, respectively.

* * * * *